UNITED STATES PATENT OFFICE.

PAUL JULIUS, HANS REINDEL, AND FRITZ CARL GÜNTHER, OF LUDWIGS-HAFEN-ON-THE-RHINE, GERMANY, ASSIGNORS TO BADISCHE ANILIN & SODA FABRIK, OF LUDWIGSHAFEN-ON-THE-RHINE, BAVARIA, GERMANY, A CORPORATION OF BADEN.

AZO DYE AND PROCESS OF MAKING SAME.

SPECIFICATION forming part of Letters Patent No. 770,177, dated September 13, 1904.

Application filed March 29, 1904. Serial No. 200,621. (No specimens.)

*To all whom it may concern:*

Be it known that we, PAUL JULIUS, a subject of the Emperor of Austria-Hungary, HANS REINDEL, a subject of the King of Bavaria, and FRITZ CARL GÜNTHER, a subject of the King of Prussia, German Emperor, all residing at Ludwigshafen-on-the-Rhine, in the Kingdom of Bavaria, Empire of Germany, have invented new and useful Improvements in Azo Coloring-Matters and Processes of Producing the Same, of which the following is a specification.

Ortho-hydroxy azo coloring-matters can be obtained from disulfonated or polysulfonated amins which possess a sulfo group in the or-the position to the amido group. The usual method of effecting the substitution of the sulfo group by the hydroxyl group has been by diazotizing the said amin sulfo-acids and treating the diazo compounds with substances which have the power of fixing mineral acids, such as carbonates, bicarbonates, or acetates of the alkalies or of the alkaline earths. (See the specifications of United States Letters Patent Nos. 710,059 and 737,967, also the specification of German Patent No. 148,882.) During the latter reaction, which consists in the replacement of the sulfo group by the hydroxyl group, sulfurous acid or a salt of sulfurous acid is formed, and this has a disturbing effect on the subsequent formation of the hydroxy azo coloring-matter, more especially since a diazo-sulfonate is formed, and this couples only very slowly with beta-naphthol.

We have now discovered that if the substitution takes place in the presence of chlorin or of a hypochlorite, or if after the substitution has taken place chlorin or a hypochlorite be added to the reaction mixture the sulfurous acid or the salt of sulfurous acid is oxidized to sulfuric acid or a salt thereof, and in consequence the subsequent yield of hydroxy azo coloring-matter is greatly increased. By this process we obtain new ortho-hydroxy coloring-matters by treating a diazotized aromatic alpha-naphthylamin sulfoacid (which contains a sulfo group in the ortho position to the diazo group) as described above and then combining the ortho-hydroxy-diazo compound with beta-naphthol. These new coloring-matters (which we desire to claim generically) are characterized by yielding blue solutions in dilute sodium-carbonate solution, blue solutions in concentrated sulfuric acid, and reddish-violet solutions in dilute caustic-soda solution. They also dye unmordanted wool dark-reddish violet shades, and these shades on treatment with a bichromate become blue black.

The new coloring-matter which we desire to claim specifically is that obtained by treating diazotized 1.2.4 - naphthylamin disulfoacid according to the hereinbefore-described process and then combining the resulting ortho-hydroxy-diazo-naphthalene sulfo-acid with beta-naphthol. This new coloring-matter possesses all the generic properties given above and also in the form of the free acid possesses the composition corresponding to the following formula:

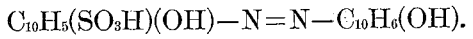

$$C_{10}H_5(SO_3H)(OH)-N=N-C_{10}H_6(OH).$$

The following examples will serve to further illustrate the nature of our invention, which, however, is not confined to these examples. The parts are by weight.

Example 1: Dissolve thirty and three-tenths (30.3) parts of 1.2.4-naphthylamin-disulfoacid in three hundred (300) parts of water and ten (10) parts of sulfuric acid (containing about ninety-six (96) per cent. of $H_2SO_4$) and add to the solution one hundred (100) parts of ice and diazotize the amin with a solution of seven (7) parts of nitrite in one hundred (100) parts of water. Neutralize the excess of acid by adding six and six-tenths (6.6) parts of calcined soda dissolved in twenty-five (25) parts of water and then add gradually while stirring a mixture of sixty-eight (68) parts of a hypochlorite solution (containing about ten (10) per cent. of active chlorin) and forty (40)

parts of calcined soda in one hundred and fifty (150) parts of water. Then add to the solution so obtained, which should be of a pure yellow color, twenty-five (25) parts of calcined soda and a solution of sixteen (16) parts of beta-naphthol in thirteen (13) parts of caustic-soda solution (containing about thirty-five (35) per cent. of NaOH) and thirty (30) parts of water. Add fifty (50) parts of common salt and stir the whole for about two (2) hours at a temperature of sixty degrees centigrade, (60° C.) The coloring-matter is then almost entirely precipitated and is filtered off with the help of the filter-pump and is pressed. Its solution in water becomes blue on the addition of sodium carbonate and reddish violet on the addition of a little caustic soda. It dissolves in concentrated sulfuric acid, yielding a blue solution. The shade produced by this coloring-matter on unmordanted wool is dark-reddish violet. This shade when treated on the fiber with a bichromate becomes blue black.

Example 2: Dissolve thirty and three-tenths (30.3) parts of alpha-naphthylamin-2.4-disulfo-acid in three hundred (300) parts of water and ten (10) parts of sulfuric acid (containing about ninety-six (96) per cent. of $H_2SO_4$) and diazotize this solution by means of a solution of seven (7) parts of sodium nitrite in one hundred (100) parts of water. Now add thirty-five (35) parts of calcined soda, at the same time cooling well, so that the temperature does not rise above fifteen degrees centigrade, (15° C.) The reaction mixture thus obtained is reddish yellow. Into this pass a stream of chlorin (preferably diluted with air) until the mixture just gives a blue color on starch-iodid paper. Pour into the mixture, which is now of a pure yellow color, a solution of from sixteen to eighteen (16 to 18) parts of beta-naphthol in thirteen (13) parts of caustic-soda solution (containing about thirty-five (35) per cent. of NaOH) and thirty (30) parts of water. Add further fifty (50) parts of common salt and stir the whole for about three (3) hours at a temperature of from fifty to fifty-five degrees centigrade, (50° to 55° C.) The precipitation of the coloring-matter is completed by the addition of more common salt, and the coloring-matter is then filtered off and pressed.

Example 3: Dissolve thirty-two and a half (32.5) parts of the acid-sodium salt of beta-naphthylamin-1.5-disulfo-acid in three hundred (300) parts of water and ten (10) parts of sulfuric acid (containing ninety-six (96) per cent. of $H_2SO_4$) and diazotize this solution by means of a solution of seven (7) parts of sodium nitrite in one hundred (100) parts of water, whereupon the diazo compound is precipitated in greenish-yellow flakes. Neutralize the excess of free mineral acid by means of soda, and while maintaining a temperature of from twenty-five to thirty degrees centigrade (25° to 30° C.) run in drop by drop a mixture of fifty (50) parts of calcined soda in two hundred (200) parts of water and sixty-two (62) parts of a solution of sodium hypochlorite, (containing about ten (10) per cent. of active chlorin.) A clear solution is obtained and the temperature rises to about thirty-five degrees centigrade, (35° C.) The substitution is complete as soon as a test portion of the liquid when added to a dilute solution of beta-naphthol in caustic soda, but which contains no excess of caustic soda, no longer yields the red coloring-matter derived from the original acid. Now pour into the yellow solution, which contains the hydroxy-diazo compound and which must not react upon starch-iodid paper, a solution of sixteen (16) parts of beta-naphthol in thirteen (13) parts of caustic-soda solution (containing about thirty-five (35) per cent. of NaOH) and thirty (30) parts of water. Add further twenty-six (26) parts of caustic-soda solution (containing about thirty-five (35) per cent of NaOH) and one hundred (100) parts of common salt and stir the whole for about five (5) hours at a temperature of forty degrees centigrade, (40° C.) When working at this concentration, the coloring-matter is almost entirely precipitated and is filtered off and pressed and can be conveniently used in the form of paste.

We claim—

1. The process for the production of ortho-hydroxy-azo coloring-matters, which process consists in acting upon a diazotized naphthylamin ortho-sulfo-acid with a substance which has the power of neutralizing free mineral acid and with a hypochlorite and then combining the ortho-hydroxy-diazo compound with an azo coloring-matter component.

2. The process for the production of ortho-hydroxy-azo coloring-matters, which process consists in acting upon a diazotized naphthylamin ortho-sulfo-acid with sodium carbonate and with a hypochlorite and then combining the ortho-hydroxy-diazo compound with an azo coloring-matter component.

3. The process for the production of ortho-hydroxy-azo coloring-matters, which process consists in acting upon a diazotized naphthylamin ortho-sulfo-acid with sodium carbonate and with a hypochlorite and then combining the ortho-hydroxy-diazo compound with beta-naphthol.

4. The process for the production of ortho-hydroxy-azo coloring-matter, which process consists in acting upon diazotized 1.2.4-naphthylamin disulfo-acid with sodium carbonate and with a hypochlorite and then combining the diazo-naphthol-sulfo-acid with beta-naphthol.

5. The ortho-hydroxy-azo coloring-matters which can be obtained by acting upon a diazotized aromatic alpha-naphthylamin ortho-sulfo-acid with sodium carbonate and with a hypochlorite and then combining the ortho-hydroxy-diazo compound with beta-naphthol, which coloring-matters yield blue solutions in dilute sodium-carbonate solution, blue solutions in concentrated sulfuric acid, and reddish-violet solutions in dilute caustic-soda solution, and which dye unmordanted wool dark-reddish violet shades, which shades on treatment with a bichromate become blue black.

6. The ortho-hydroxy-azo coloring-matter which can be obtained by acting upon diazotized 1.2.4-naphthylamin-disulfo-acid with sodium carbonate and with a hypochlorite and then combining the ortho-hydroxy-diazo compound with beta-naphthol, which coloring-matter yields a blue solution in dilute sodium-carbonate solution, a blue solution in concentrated sulfuric acid, and a reddish-violet solution in dilute caustic-soda solution, which dyes unmordanted wool dark-reddish violet shades, which shades on treatment with a bichromate become blue black, which coloring-matter in the form of the free acid possesses the composition corresponding to the formula:

$$C_{10}H_5(SO_3H)(OH)-M=N-C_{10}H_6(OH).$$

In testimony whereof we have hereunto set our hands in the presence of two subscribing witnesses.

PAUL JULIUS.
HANS REINDEL.
FRITZ CARL GÜNTHER.

Witnesses:
  H. W. HARRIS,
  J. ALEC. LLOYD.